United States Patent Office 3,682,648
Patented Aug. 8, 1972

3,682,648
GREEN COFFEE DECAFFEINATION USING EDIBLE ESTER SOLUTIONS
William A. Mitchell, Lincoln Park, N.J., and Robert Klose, West Nyack, N.Y., assignors to General Foods Corporation, White Plains, N.Y.
No Drawing. Filed May 27, 1970, Ser. No. 41,101
Int. Cl. A23f 1/10
U.S. Cl. 99—70      8 Claims

ABSTRACT OF THE DISCLOSURE

Process for decaffeinating green coffee beams with solutions of esters of polyhydric alcohols and edible carboxylic acids to produce beans having residual quantities of said ester, and amounts of sugar and other non-caffeine coffee solubles substantially the same as that existing in the beans prior to decaffeination.

BACKGROUND OF THE INVENTION

The present invention relates to a new and improved process for decaffeinating whole or ground green coffee beans. Whole or ground green beans will be understood in the context of this invention to also encompass blends of varying grades or strains of coffees.

Generally, the art of coffee decaffeination may be divided, based upon solvents used, into the categories of aqueous and organic solvents (principally chlorinated hydrocarbons); each having relative advantages and disadvantages insofar as rates and extent of caffeine and non-caffeine solids removal, temperatures necessitated, costs, ease of solvent removal, and extent of taste impairment in the final decaffeinated coffee.

In the case of aqueous solvent decaffeination, there is swift extraction of caffeine however, the affinity of the aqueous system to also remove large or undue quantities of non-caffeine coffee solids tends to degrade the ultimate coffee flavor.

On the other hand, hydrocarbon systems (principally chlorinated) for decaffeination require longer extraction times and removal of solvent is difficult; nevertheless, coffees resulting therefrom undergo less flavor impairment. Moreover, solvent removal requires protracted treatment of the decaffeinated coffee, by steam, to ensure against high residual levels of solvents.

Accordingly, the challenge of paramount importance in the decaffeination art is that of prescribing a solvent or mixture of solvents in which caffeine is readily soluble and in which noncaffeine coffee solids are insoluble or poorly soluble, and wherein the residual quantities of said solvent remaining in the beans are not toxic.

The essential objective of this invention is the selection of a decaffeination solvent which is edible, having a high capacity for caffeine, and a low or negligible capacity for coffee sugars and other non-caffeine solids.

Another object of the invention is to provide a decaffeination solvent system which will eliminate prolonged and harsh steaming to remove miniscule quantities of said solvent.

A further object of the invention is to prescribe a decaffeination solvent system which produces minimum impairment or degradation of the ultimate coffee flavor.

A yet further object of the invention is to provide a decaffeination solvent system from which caffeine is easily removed by crystallization upon mere lowering of the solvent temperature.

Other objects and advantages of the invention will become apparent in the description and examples hereinafter appearing.

SUMMARY OF THE INVENTION

It has now been discovered that green coffee beans may be effectively decaffeinated with a solution of esters of polyhydric alcohols with edible carboxylic acids. Decaffeinating solvents prepared from the esters extract negligible amounts of sugar and other non-caffeine coffee solubles, and when residual quantities remain in the beans the solvent does not render coffee prepared therefrom inedible.

Preferably, the decaffeination is accomplished by employing a saturated solution of the acetic acid esters of propylene glycol or glycerol, either in batch or continuous process, until the desired degree of caffeine extraction is obtained. Other edible carboxylic acids which may be reacted with polyhydric alcohols may include propionic, fumaric, and the like. Basically, the process may be delineated by: (1) initial moistening of the green beans; (2) extracting the moistened beans with a solution of the acetic acid esters of propylene glycol or glycerol; (3) and washing or solvent stripping the extracted green beans.

DETAILED DESCRIPTION OF THE INVENTION

Prior to decaffeinating, the premoistening step merely involves uniformly incorporating water throughout the green beans for purposes of swelling said beans, and solubilizing the caffeine preparatory to extraction. Premoistening may be accomplished by either adding water and mixing the beans, by introducing humidified air or other gases, or by employing steam. While the moisture contents of the bean may range anywhere from about 10 to 50%, it is preferable to extract beans having between 30 to 45% moisture.

The extraction process may be either batch or continuous, and the factors considered in determining such are the extent of decaffeination desired, the quantity of solvent employed, caffeine solubility in the solvent, and the solvent temperature. If desired, small amounts of other solvents such as ethanol may be used along with edible ester solutions to improve caffeine solubility. During extraction, the temperature and extraction time should respectively be low and short, to curtail any potential flavor impairment.

The extraction temperature is not critical, however, the higher the temperature of extraction the greater the removal of caffeine, and the faster the rate of removal. It is preferred to maintain the extracting solvent temperatures between about 50° C. to 120° C.; most preferred however is a temperature of about 80° C. The ratio of solvent-solution-to-bean during extraction is similarly not critical, but chosen to insure the most rapid rate of decaffeination.

The solvent is a mixture of water and ester. Any concentration of ester to water is operable, however, it is preferred to employ a saturated solution when employing the acetate esters of glycerol (about 87 parts by volume of the triacetate to about 13 parts by volume of water at 80° C.).

Following the extraction step, the green beans are removed from the ester solution and stripped of most of the solvent clinging to the surface of the bean and that within its interior, except for small residual amounts. Stripping may be performed by employing either saturated or superheated steam. Alternatively vacuum, air at ambient temperature or humidified gas may be utilized to remove the solvent.

Removal of the caffeine from the solvent may be accomplished by any of the conventional techniques—such as removal of the solvent by evaporation or direct crystallization, however, since only minute quantities of non-caffeine solids are extracted, the separation by crystallization upon lowering the temperature is readily convenient.

Example I

About 500 grams of a blend of Milds/Santos/Robusta green beans are hydrated with about 250 milliliters of water in a mixer at 40° C. until the beans contained about 36.5% moisture.

The hydrated beans are placed in a column and extracted by continuously pumping a solution of glycerol triacetate (containing about 13 parts by volume of water) heated to 80° C. through the beans. The caffeine rich solvent is collected in batches representing one hour extractions. The caffeine content of the caffeine rich solvent is determined by diluting a portion of the batch with water and making readings at 272 m$\mu$ using a Beckman ultraviolet instrument. The caffeine values, determined by ultraviolet analysis are:

| Fraction | Ml. of solvent recovered | Milligrams of caffeine |
|---|---|---|
| 1 | 1,240 | 2,902 |
| 2 | 1,520 | 1,520 |
| 3 | 1,250 | 300 |
| 4 | 1,320 | 172 |
| Total | | 4,894 |

The starting bean material contained about 1.54% caffeine. This calculates to $$\frac{4,894}{7.70} \times 100 = 63.6\%$$

of caffeine extracted.

Example II

About 600 grams of coarsely ground blend of Milds/Santos/Robusta green beans are hydrated with about 300 milliliters of water in a mixer at about 40° C. until the beans are hydrated to about 38.5% water.

The hydrated beans are placed in a column and continuously extracted for four one-hour periods with a saturated solution of glycerol triacetate (1300 ml. triacetin and 200 ml. water) at 80° C. The fractions are analyzed for caffeine after a total extraction time of about 4 hours by ultraviolet means as in Example I to produce the following:

| Fraction | Ml. of solvent recovered | Milligrams of caffeine |
|---|---|---|
| 1 | 1,250 | 5,125 |
| 2 | 1,300 | 1,820 |
| 3 | 1,255 | 674 |
| 4 | 1,450 | 834 |

$$\frac{8,474}{9.24} \times 100 = 92\%$$

of caffeine extracted.

Following termination of extraction in both examples, the beans are rinsed with alcohol and dried, or conventionally stripped of solvent by steam and dried for storage.

Example III

When a mixture of equal portions of the mono- and diacetate of propylene glycol are substituted for the glycerol triacetate of Example II comparable caffein extraction results are produced.

Example IV

When the glycerol triacetate of Example I is replaced by a mixture of equal parts of mono-, di-, and triacetate esters of glycerol there is obtained comparable caffeine extraction.

It will be understood that while the invention has been described with reference to the above examples, the invention is not limited thereto.

What is claimed is:

1. A process for decaffeinating green coffee beans comprising hydrating said beans to increase the moisture content, and extracting the hydrated beans with an aqueous solution of water and an ester of a polyhydric alcohol and an edible carboxylic acid and stripping said solution from the coffee.

2. The process of claim 1, wherein the polyhydric alcohol is selected from the group consisting of propylene glycol and glycerol.

3. The process of claim 1, wherein the carboxylic acid is acetic acid and the extraction is followed by steam stripping the solvent solution.

4. The process of claim 1, wherein the ester is an acetic acid ester of glycerol.

5. The process of claim 4, wherein the ester is selected from the group consisting of the mono, di and triacetic acid esters of glycerol and mixtures thereof.

6. The process of claim 4, wherein a saturated solution of glycerol triacetate and water is employed at temperatures ranging from about 50° C. to 120° C.

7. The process of claim 1, wherein the ester is an acetic acid ester of propylene glycol.

8. The process of claim 7, wherein the ester is selected from the group consisting of the mono and diacetic acid esters of propylene glycol and mixtures thereof.

References Cited

UNITED STATES PATENTS

| 2,817,588 | 12/1957 | Barch | 99—70 |
| 953,643 | 3/1910 | Seisser | 99—70 |
| 1,964,814 | 7/1934 | Gilbert | 99—70 |
| 2,016,634 | 10/1935 | Grethe | 99—70 |
| 2,563,233 | 8/1951 | Gilmont | 99—70 |

FOREIGN PATENTS

| 247,039 | 2/1926 | Great Britain | 99—69 |

FRANK W. LUTTER, Primary Examiner

W. L. MENTLIK, Assistant Examiner